United States Patent
Huang et al.

(10) Patent No.: US 12,147,368 B2
(45) Date of Patent: Nov. 19, 2024

(54) METHOD OF TRANSMITTING UNIVERSAL SERIAL BUS (USB) COMMANDS AND ASSOCIATED ELECTRONIC DEVICE

(71) Applicant: REALTEK SEMICONDUCTOR CORPORATION, Hsinchu (TW)

(72) Inventors: Chih-Yuan Huang, Hsinchu (TW); Zhen-Ting Huang, Hsinchu (TW); Chun-Hao Lin, Hsinchu (TW); Er-Zih Wong, Hsinchu (TW); Shih-Chiang Chu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 37 days.

(21) Appl. No.: 17/992,981

(22) Filed: Nov. 23, 2022

(65) Prior Publication Data

US 2023/0169029 A1   Jun. 1, 2023

(30) Foreign Application Priority Data

Nov. 29, 2021 (TW) ................................ 110144454

(51) Int. Cl.
*G06F 13/40* (2006.01)
(52) U.S. Cl.
CPC .. *G06F 13/4059* (2013.01); *G06F 2213/0042* (2013.01)

(58) Field of Classification Search
CPC ........................................................ G06F 21/57
See application file for complete search history.

(56) References Cited

U.S. PATENT DOCUMENTS

| | | | | |
|---|---|---|---|---|
| 6,505,267 B2 * | 1/2003 | Luke | ................... | G06F 13/4018 710/305 |
| 8,180,931 B2 * | 5/2012 | Lee | ....................... | G06F 3/0688 710/5 |
| 8,745,304 B2 * | 6/2014 | Andersson | ............ | G06F 13/102 710/305 |
| 11,216,398 B2 | 1/2022 | Wong et al. | | |

* cited by examiner

*Primary Examiner* — Henry Tsai
*Assistant Examiner* — Juanito C Borromeo
(74) *Attorney, Agent, or Firm* — WPAT, P.C

(57) ABSTRACT

An electronic device and a method of transmitting USB commands are provided. The method includes: (A) allocating a buffer area in a memory; (B) receiving a USB command; (C) retrieving control transfer information of the USB command; (D) storing the control transfer information in the buffer area; (E) repeating steps (B) to (D) until a condition for ending a control aggregation is met; (F) generating an aggregated USB command according to the content of the buffer area; and (G) transmitting the aggregated USB command.

18 Claims, 7 Drawing Sheets

METHOD OF TRANSMITTING UNIVERSAL SERIAL BUS (USB) COMMANDS AND ASSOCIATED ELECTRONIC DEVICE

BACKGROUND OF THE INVENTION

1. Field of the Invention

The present invention generally relates to a Universal Serial Bus (USB), and, more particularly, to methods of transmitting USB commands and related electronic devices.

2. Description of Related Art

In the prior art, the USB controller on the host side operates the USB device by sending USB commands Reference is made to FIG. 1, which shows a schematic diagram of the host side sending USB commands and receiving acknowledges ("ACK" for short). As shown in FIG. 1, each time the application layer on the host side sends a USB command (e.g., a control transfer command) (CMD_A, CMD_B, CMD_C, and CMD_D) to the hardware layer, the application layer must wait for the hardware layer to send the ACK (e.g., ACK_A, ACK_B, ACK_C, and ACK_D, corresponding to the USB commands CMD_A, CMD_B, CMD_C, and CMD_D, respectively). Each ACK is a handshake procedure. Therefore, performing consecutive operations on the USB device costs the USB controller a lot of time to receive and process the ACKs, degrading the performance of the electronic device. In particular, when frequent read and write operations are necessary for the USB devices in certain states (e.g., initialization, resuming from sleep, etc.), a more efficient method that can reduce the number of bus input/output requests (bus I/O requests) is needed.

SUMMARY OF THE INVENTION

In view of the issues of the prior art, an object of the present invention is to provide USB command transmission methods and related electronic devices, so as to make an improvement to the prior art.

According to one aspect of the present invention, an electronic device for transmitting USB commands is provided. The electronic device includes a USB controller circuit, a memory circuit, and a processor circuit. The memory circuit stores at least one of a plurality of program codes and program instructions. The processor circuit is configured to execute at least one of the program codes and program instructions for enabling the performance of the following steps: (A) allocating a buffer area in the memory circuit; (B) receiving a USB command; (C) retrieving control transfer information of the USB command; (D) storing the control transfer information in the buffer area; (E) repeating steps (B) to (D) until a condition for ending a control aggregation is met; (F) generating an aggregated USB command according to a content of the buffer area; and (G) transmitting the aggregated USB command to the USB controller circuit.

According to another aspect of the present invention, a method of transmitting USB commands is provided. The method includes the following steps: (A) allocating a buffer area in a memory circuit; (B) receiving a USB command; (C) retrieving control transfer information of the USB command; (D) storing the control transfer information in the buffer area; (E) repeating steps (B) to (D) until a condition for ending a control aggregation is met; (F) generating an aggregated USB command according to a content of the buffer area; and (G) transmitting the aggregated USB command.

The USB command transmission method and related electronic device of the present invention can aggregate multiple USB commands to reduce the number of handshakes for the acknowledges. In comparison with the prior art, the USB command transmission method and the related electronic device of the present invention do not spend a lot of time on the handshakes for messages, which improves the performance.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes methods of transmitting Universal Serial Bus (USB) commands and associated electronic devices. On account of that some or all elements of the electronic devices could be known, the detail of such elements is omitted provided that such detail has little to do with the features of this disclosure, and that this omission nowhere dissatisfies the specification and enablement requirements. Some or all of the processes of the methods of transmitting USB commands may be implemented by software and/or firmware, and can be performed by the electronic devices or their equivalents. A person having ordinary skill in the art can choose components or steps equivalent to those described in this specification to carry out the present invention, which means that the scope of this invention is not limited to the embodiments in the specification.

Figure 1:
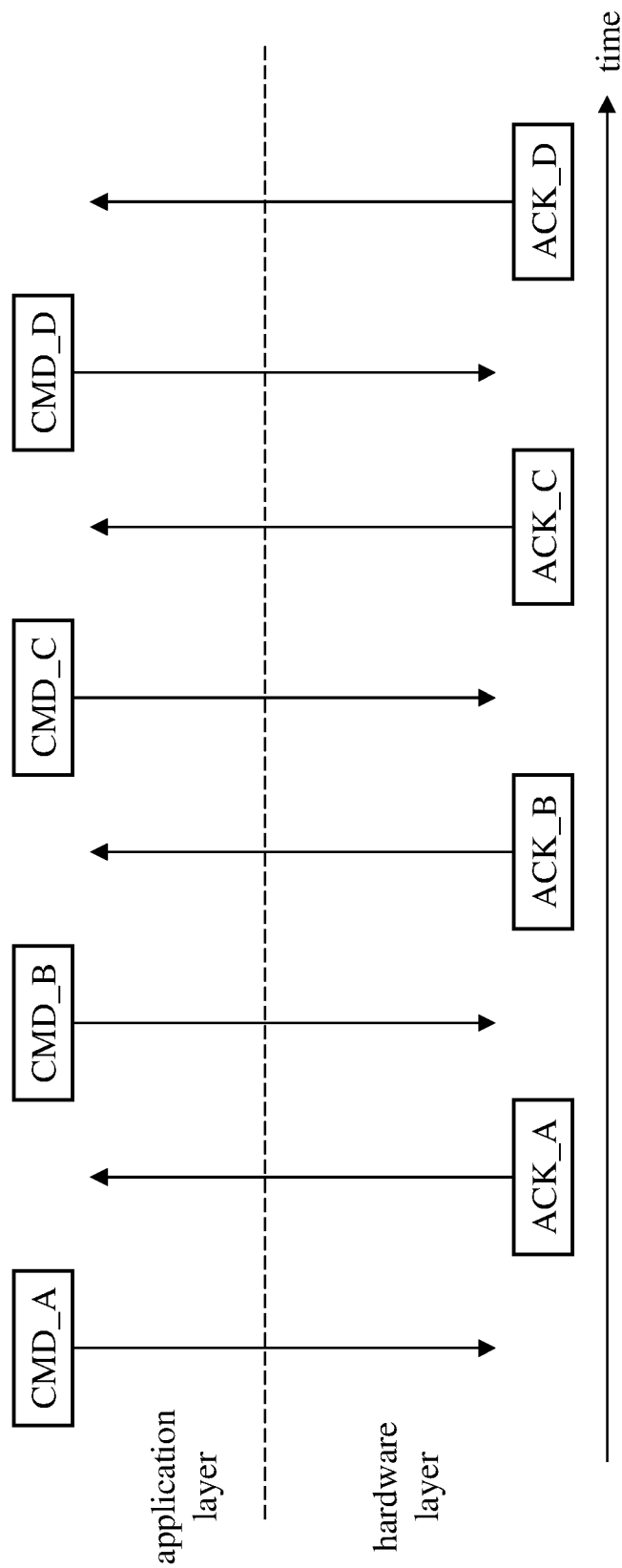
FIG. 1 shows a schematic diagram of the host side sending USB commands and receiving acknowledges.
Figure 2:
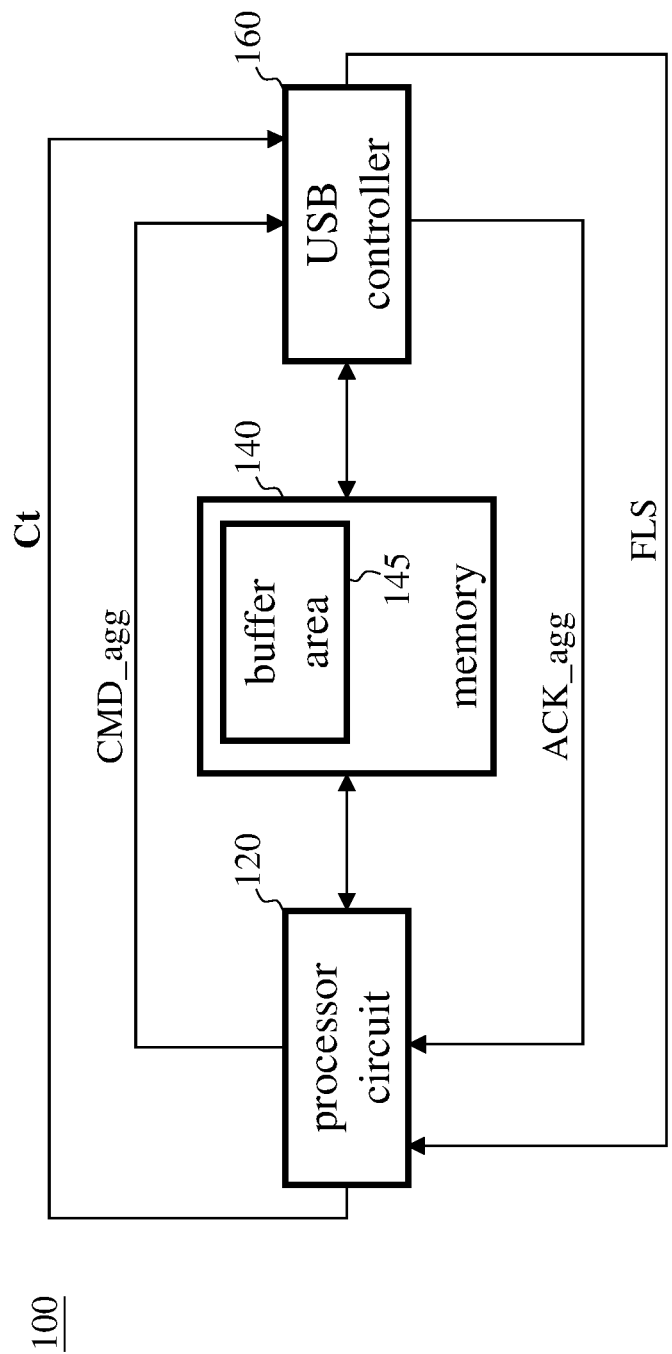
FIG. 2 is a functional block diagram of the electronic device according to an embodiment of the present invention.

FIG. 2 is a functional block diagram of the electronic device according to an embodiment of the present invention. The electronic device 100 includes a processor circuit 120, a memory (or memory circuit) 140, and a USB controller (or USB controller circuit) 160. The processor circuit 120, the memory 140, and the USB controller 160 are electrically coupled to each other. The memory 140 includes a buffer area 145. In some embodiments, the electronic device 100 operates as a host and uses the USB controller 160 to communicate or cooperate with a USB device (not shown). For example, the processor circuit 120 may be a processor, a microprocessor unit, a digital signal processor, an application specific integrated circuit (ASIC) of a computer, tablet, or mobile phone, or an equivalent circuit thereof, and the processor circuit 120 communicates, through the USB controller 160, with a USB network interface card (NIC) (i.e., a USB device) to transmit or receive network packets.

The memory 140 stores program codes or program instructions, and the processor circuit 120 carries out some or all of the functions of the electronic device 100 by executing the program codes or program instructions. The program codes or program instructions stored in the memory 140 include the firmware of the USB controller 160, and the processor circuit 120 further controls the USB controller 160 by executing the firmware. For example, when the application layer that the processor circuit 120 executes issues a USB command, the firmware of the USB controller 160 controls the USB controller 160 to perform corresponding operations (e.g., reading, writing, transmitting, receiving, etc.) according to the USB command.

Figure 3:
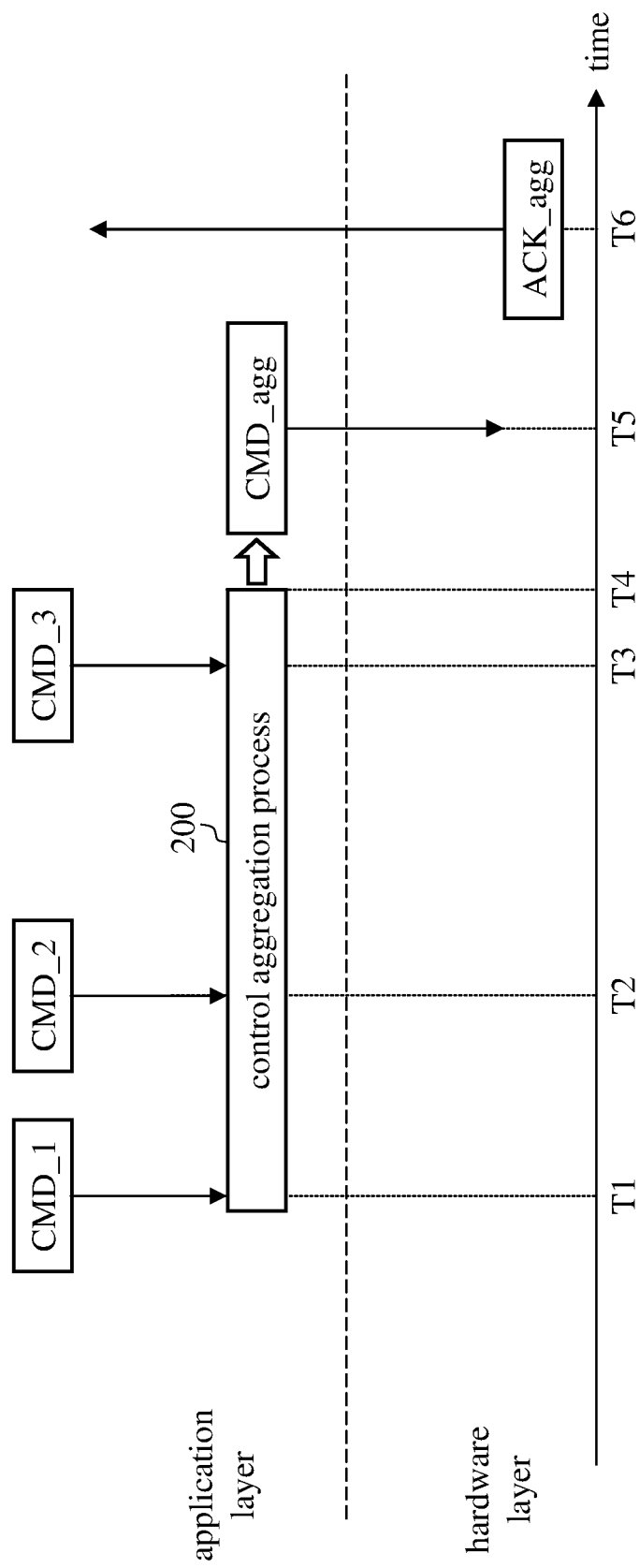
FIG. 3 is a schematic diagram of control aggregation according to an embodiment of the present invention.
Figure 4:
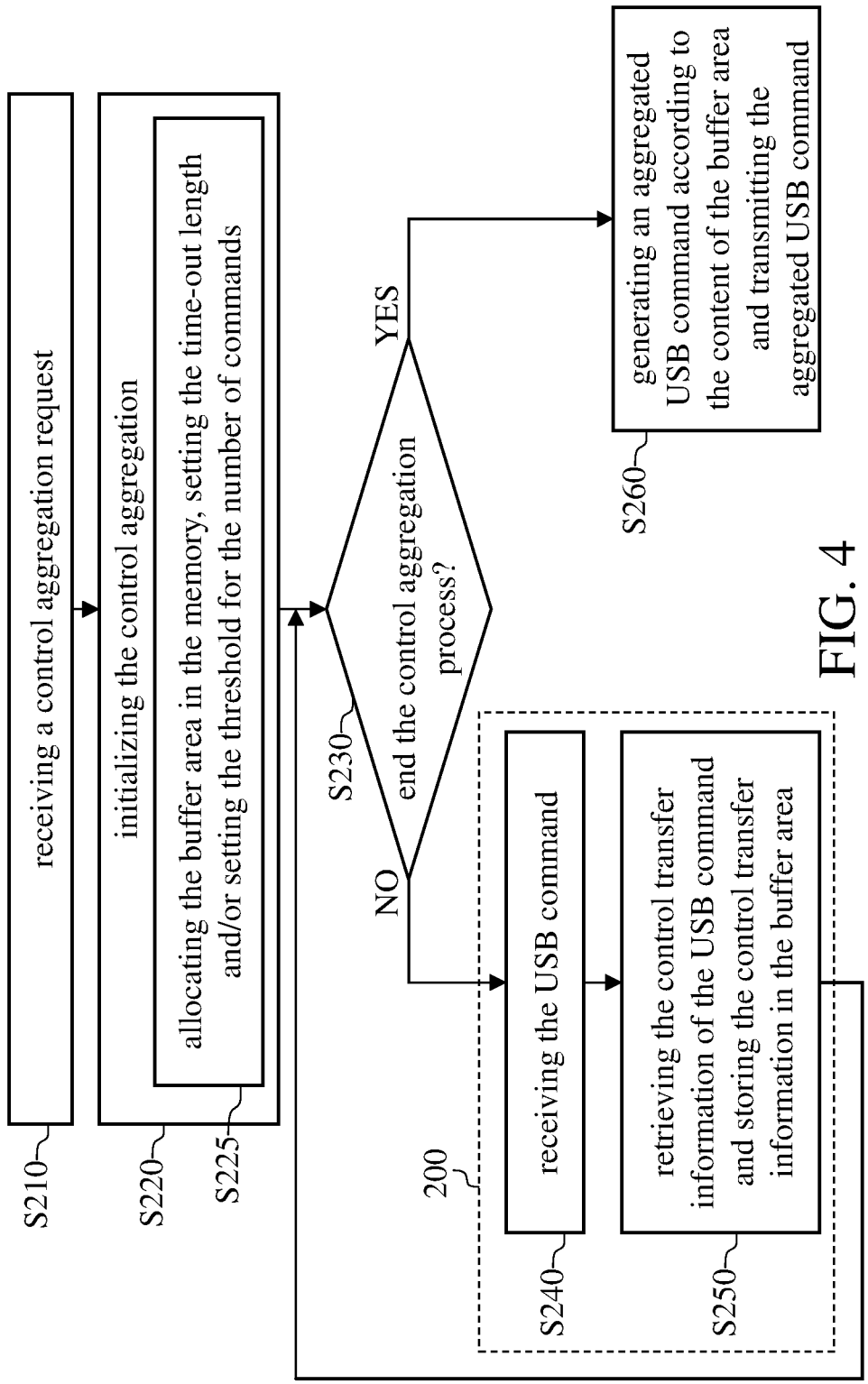
FIG. 4 is a flowchart of a method of transmitting USB commands according to an embodiment of the present invention.

FIG. 3 is a schematic diagram of the control aggregation according to an embodiment of the present invention. FIG. 4 is a flowchart of a method of transmitting USB commands according to an embodiment of the present invention. The method includes the following steps. The following discussions are made in connection with FIGS. 2-4.

Step S210: The processor circuit 120 (more specifically, the firmware of the USB controller 160 that the processor circuit 120 executes) receives a control aggregation request. In some embodiments, the control aggregation request is issued by an application (application layer) that the processor circuit 120 executes.

Step S220: The processor circuit 120 (more specifically, the firmware of the USB controller 160 that the processor circuit 120 executes) initializes the control aggregation. In some embodiments, step S220 includes sub-step S225: The processor circuit 120 (more specifically, the firmware of the USB controller 160 that the processor circuit 120 executes) allocates the buffer area 145 in the memory 140, sets the time-out length (or time-out value) and/or sets the threshold for the number of commands. The buffer area 145 is used to buffer USB commands; that is, upon receiving a USB command, the firmware of the USB controller 160 can buffer the USB command in the buffer area 145 instead of immediately controlling the USB controller 160 to process the USB command. As shown in the example of FIG. 3, when the firmware of the USB controller 160 receives the USB command CMD_1, the USB command CMD_2, and the USB command CMD_3 at the time point T1, the time point T2, and the time point T3 respectively, the firmware of the USB controller 160 executes the control aggregation process 200 instead of issuing the USB command, and then issues the aggregated USB command CMD_agg at the time point T5. The control aggregation process 200 includes steps S240 and S250, which are detailed below.

Step S230: The processor circuit 120 (more specifically, the firmware of the USB controller 160 that the processor circuit 120 executes) determines whether to end the control aggregation process 200. In some embodiments, when any one of the following conditions is met (i.e., the result of step S230 is YES), the firmware of the USB controller 160 ends the control aggregation process 200 and generates the aggregated USB command CMD_agg (step S260): (1) the buffer area 145 is full (i.e., there is no free space or the free space is not sufficient to store more USB commands (e.g., to store the control transfer information of the USB command)); (2) time-out occurs; (3) a command to flush the buffer area 145 is received; or (4) the number of USB commands currently buffered in the buffer area 145 is greater than the threshold for the number of commands In some embodiments, when none of the above-mentioned conditions (1) to (4) is met (i.e., the result of step S230 is NO), the firmware of the USB controller 160 continues to perform the control aggregation process 200 (i.e., continues to perform step S240 and step S250).

In some embodiments, conditions (2) and (4) may be monitored using a timer and counter, respectively. For example, for condition (2), the firmware of the USB controller 160 may use a timer to time the duration of the control aggregation process 200, thereby controlling the execution time thereof; when the execution time is greater than the time-out value, the result of step S230 is YES. For another example, for condition (4), the firmware of the USB controller 160 increases the count value of the counter by 1 each time the firmware of the USB controller 160 performs step S240; when the count value is greater than the threshold for the number of commands, the result of step S230 is YES.

Step S240: The processor circuit 120 (more specifically, the firmware of the USB controller 160 that the processor circuit 120 executes) receives the USB command issued by the application layer. As shown in the example of FIG. 3, step S240 occurs at the time point T1 when the USB command CMD_1 is being received, time point T2 when the USB command CMD_2 is being received, or time point T3 when the USB command CMD_3 is being received.

Figure 5:
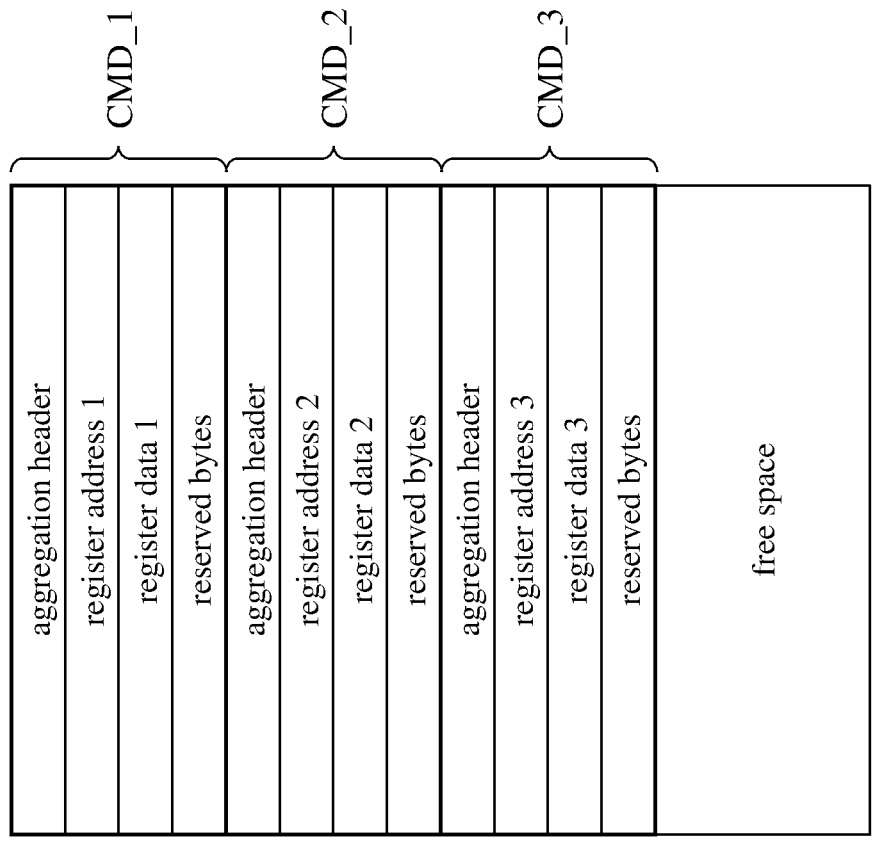
FIG. 5 shows an example of the content of the buffer area.

Step S250: The processor circuit 120 (more specifically, the firmware of the USB controller 160 that the processor circuit 120 executes) retrieves the control transfer information of the USB command, and stores the control transfer information in the buffer area 145. The control transfer information includes the type of the USB command (e.g., read command, write command, or control command), address (e.g., read address or write address), and data (e.g., data to be written, control data). FIG. 5 shows an example of the content of the buffer area 145. The aggregation header can represent the type of USB command. The register address can represent the address of the USB command. The register data can represent data of the USB command. The reserved bytes can represent or specify the type of the register (e.g., register for the physical layer or register for the media access control (MAC) layer).

More specifically, as shown in the examples of FIG. 3 and FIG. 5, upon receiving the USB command CMD_1 (i.e., at the time point T1), the firmware of the USB controller 160 first retrieves the control transfer information of the USB command CMD_1 and then stores the control transfer information in the first to fourth rows of the buffer area 145; upon receiving the USB command CMD_2 (i.e., at the time point T2), the firmware of the USB controller 160 first retrieves the control transfer information of the USB command CMD_2 and then stores the control transfer information in the fifth to eighth rows of the buffer area 145; upon receiving the USB command CMD_3 (i.e., at the time point T3), the firmware of the USB controller 160 first retrieves the control transfer information of the USB command CMD_3 and then stores the control transfer information in the ninth to twelfth rows of the buffer area 145. FIG. 5 is intended to illustrate the invention by way of examples, rather than to limit the scope of the claimed invention;

people having ordinary skill in the art can arrange the control transfer information of the USB commands in various ways.

People having ordinary skill in the art can perform the operation of "retrieving the control transfer information of the USB commands" according to Chapter 4 and Chapter 8 of the USB 3.0 specification; the details are omitted for brevity.

Step S260: The processor circuit 120 (more specifically, the firmware of the USB controller 160 that the processor circuit 120 executes) generates the aggregated USB command CMD_agg according to the content of the buffer area 145 and transmits the aggregated USB command CMD_agg. For example, as shown in FIG. 3, if the firmware of the USB controller 160 ends the control aggregation process 200 at the time point T4 (i.e., the result of step S230 is YES), and the content of the buffer area 145 at the time point T4 is as shown in FIG. 5 (i.e., the firmware of the USB controller 160 has aggregated the USB command CMD_1, the USB command CMD_2, and the USB command CMD_3 so far), the firmware of the USB controller 160 generates, according to the content of the buffer area 145, the aggregated USB command CMD_agg, which equivalently includes the USB command CMD_1, the USB command CMD_2, and the USB command CMD_3, and then transmits the aggregated USB command CMD_agg to the USB controller 160 at the time point T5.

In some embodiments, the length between the time point T4 and the time point T5 is dependent on the computing power of the processor circuit 120; the greater the computing power of the processor circuit 120, the shorter the length between the time point T4 and the time point T5. In some embodiments, the length between time point T4 and time point T5 is close to zero.

After receiving the aggregated USB command CMD_agg, the USB controller 160 operates according to the aggregated USB command CMD_agg. More specifically, the USB controller 160 configures the register(s) inside the USB controller 160 based on the control transfer information of multiple USB commands in the aggregated USB command CMD_agg to perform corresponding operations. For example, if the USB command CMD_1, the USB command CMD_2, and the USB command CMD_3 are all write operations, the USB controller 160 performs three write operations according to the content of the aggregated USB command CMD_agg, and then sends an acknowledge ACK_agg to the application layer at the time point T6. Therefore, the present invention can reduce the number of bus I/O requests on the bus as well as the number of handshakes that the processor circuit 120 needs to process, which, in other words, improves the performance of the electronic device 100.

In some embodiments, multiple USB commands corresponding to the same aggregated USB command CMD_agg are commands of the same type; for example, they both/all are read commands, write commands, or control commands.

Figure 6:
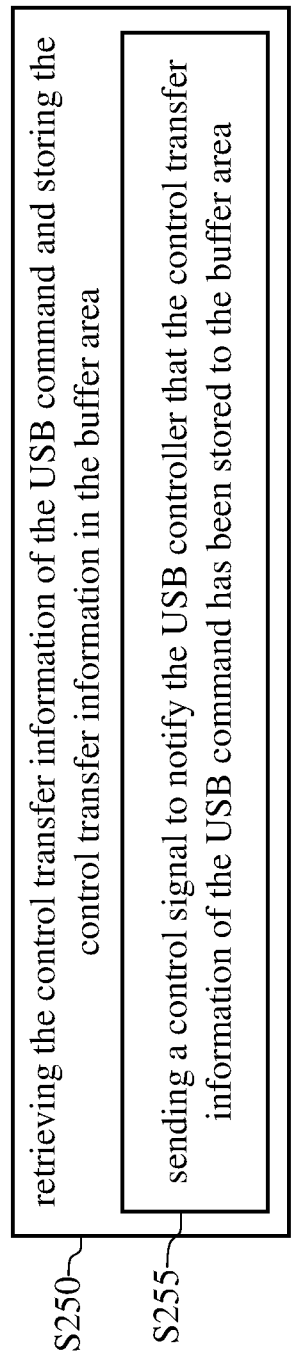
FIG. 6 shows sub-step S255 of step S250.
Figure 7:
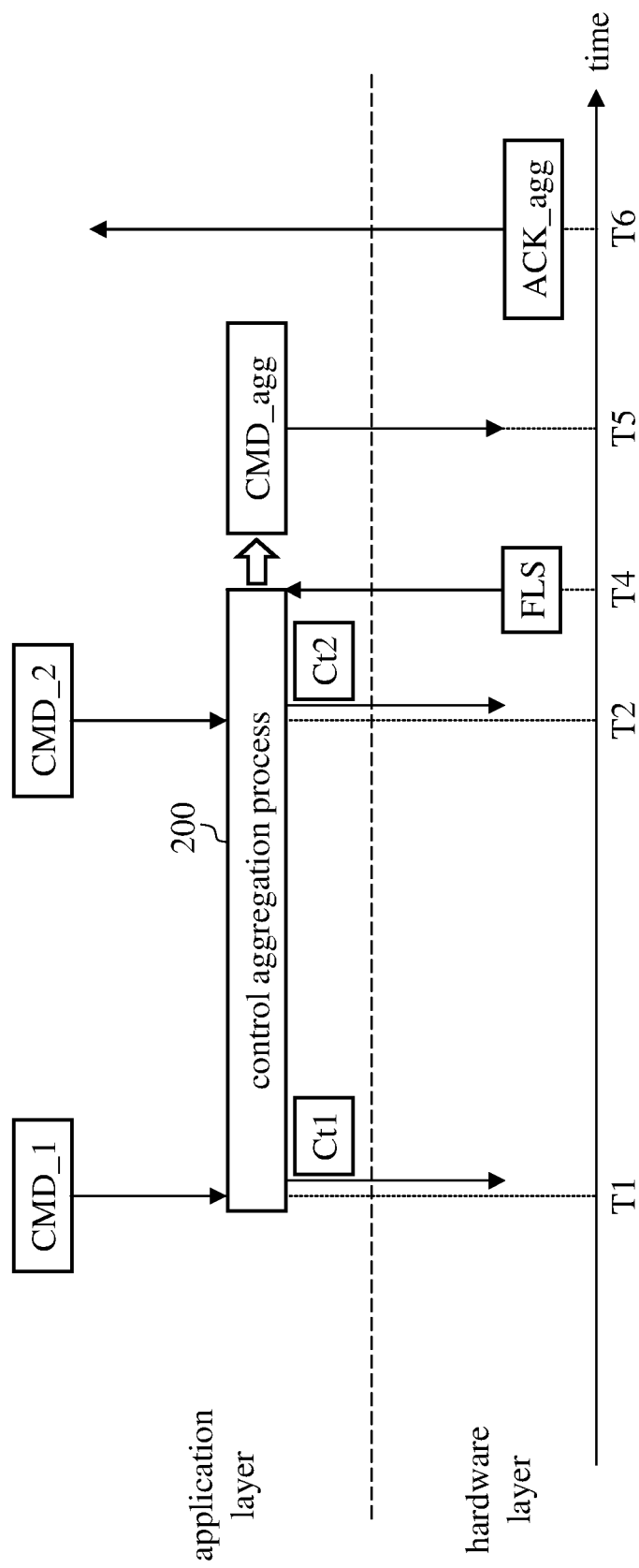
FIG. 7 is a schematic diagram of control aggregation according to another embodiment of the present invention.

In some embodiments, as shown in FIG. 6, step S250 includes sub-step S255: The processor circuit 120 (more specifically, the firmware of the USB controller 160 that the processor circuit 120 executes) sends a control signal Ct to notify the USB controller 160 that it has finished storing the control transfer information of the USB command to the buffer area 145. FIG. 7 shows a schematic diagram of the control aggregation corresponding to FIG. 6. Reference is made to FIG. 2, FIG. 6, and FIG. 7 for the following discussions. The firmware of the USB controller 160 sends the control signal Ct1 and the control signal Ct2 to the USB controller 160 at approximately the time point T1 and approximately the time point T2, respectively. The control signal Ct1 is used to notify the USB controller 160 that the storing of the control transfer information of the USB command CMD_1 in the buffer area 145 has been completed, and the control signal Ct2 is used to notify the USB controller 160 that the storing of the control transfer information of the USB command CMD_2 in the buffer area 145 has been completed. The USB controller 160 can determine, based on the control signal Ct, whether to instruct the processor circuit 120 (more specifically, the firmware of the USB controller 160) to flush the buffer area 145. In the example of FIG. 7, the USB controller 160 issues at the time point T4 a command FLS based on which the firmware of the USB controller 160 may end the control aggregation process 200 (i.e., the result of step S230 is YES). In other words, by issuing the command FLS, the USB controller 160 can actively request the processor circuit 120 to transmit the aggregated USB command CMD_agg, which allows for more flexibility for the design or application of the electronic device 100.

To sum up, according to the present invention, the USB commands are aggregated and then transmitted at once in the form of an aggregated USB command which is an equivalent of multiple USB commands Therefore, the electronic device and the USB command transmission method of the present invention can save the time and computing resources that are otherwise spent in processing the acknowledges, which improves the performance of the electronic device.

Since a person having ordinary skill in the art can appreciate the implementation detail and the modification thereto of the present method invention through the disclosure of the device invention, repeated and redundant description is thus omitted. Please note that the shape, size, and ratio of any element in the disclosed figures are exemplary for understanding, not for limiting the scope of this invention. Furthermore, there is no step sequence limitation for the method inventions as long as the execution of each step is applicable. In some instances, the steps can be performed simultaneously or partially simultaneously.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:
1. An electronic device for transmitting Universal Serial Bus (USB) commands, the electronic device comprising:
   a USB controller circuit;
   a memory circuit electrically coupled to the USB controller circuit and configured for storing at least one of a plurality of program codes and program instructions; and
   a processor circuit electrically coupled to the USB controller circuit and the memory circuit and configured to execute at least one of the program codes and program instructions for enabling the performance of the following steps:
      (A) allocating a buffer area in the memory circuit;
      (B) receiving a USB command;
      (C) retrieving control transfer information of the USB command;
      (D) storing the control transfer information in the buffer area;

(E) repeating steps (B) to (D) until a condition for ending a control aggregation is met;
(F) generating an aggregated USB command according to a content of the buffer area; and
(G) transmitting the aggregated USB command to the USB controller circuit.

2. The electronic device of claim 1, wherein the condition for ending the control aggregation is that a free space in the buffer area is insufficient.

3. The electronic device of claim 1 further comprising:
(H) when step (D) is completed, using a control signal to notify the USB controller circuit that the control transfer information of the USB command has been stored in the buffer area.

4. The electronic device of claim 3, wherein in response to the control signal, the USB controller circuit sends a command to flush the buffer area, and the condition for ending the control aggregation is receiving the command.

5. The electronic device of claim 1, wherein the condition for ending the control aggregation is a time-out.

6. The electronic device of claim 1, wherein the condition for ending the control aggregation is that the number of the USB commands stored in the buffer area is greater than a threshold.

7. The electronic device of claim 1, wherein the aggregated USB command is an aggregation of a plurality of read commands.

8. The electronic device of claim 1, wherein the aggregated USB command is an aggregation of a plurality of write commands.

9. The electronic device of claim 1, wherein the aggregated USB command is an aggregation of a plurality of control commands.

10. A method of transmitting Universal Serial Bus (USB) commands, comprising:
(A) allocating a buffer area in a memory circuit;
(B) receiving a USB command;
(C) retrieving control transfer information of the USB command;
(D) storing the control transfer information in the buffer area;
(E) repeating steps (B) to (D) until a condition for ending a control aggregation is met;
(F) generating an aggregated USB command according to a content of the buffer area; and
(G) transmitting the aggregated USB command.

11. The method of claim 10, wherein the condition for ending the control aggregation is that a free space in the buffer area is insufficient.

12. The method of claim 10 further comprising:
(H) when step (D) is completed, using a control signal to notify a USB controller circuit that the control transfer information of the USB command has been stored in the buffer area.

13. The method of claim 12, wherein in response to the control signal, the USB controller circuit sends a command to flush the buffer area, and the condition for ending the control aggregation is receiving the command.

14. The method of claim 10, wherein the condition for ending the control aggregation is a time-out.

15. The method of claim 10, wherein the condition for ending the control aggregation is that the number of the USB commands stored in the buffer area is greater than a threshold.

16. The method of claim 10, wherein the aggregated USB command is an aggregation of a plurality of read commands.

17. The method of claim 10, wherein the aggregated USB command is an aggregation of a plurality of write commands.

18. The method of claim 10, wherein the aggregated USB command is an aggregation of a plurality of control commands.

* * * * *